(12) United States Patent
Grycewicz

(10) Patent No.: US 6,567,566 B1
(45) Date of Patent: May 20, 2003

(54) TECHNIQUES TO IMPROVE BINARY JOINT TRANSFORM CORRELATOR, PARTICULARLY FOR FINGERPRINT RECOGNITION

(75) Inventor: Thomas J. Grycewicz, Fremont, CA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/299,929

(22) Filed: Apr. 27, 1999

(51) Int. Cl.[7] .................................................. G06K 9/64
(52) U.S. Cl. ...................... 382/278; 382/280; 382/284
(58) Field of Search ................................. 382/284, 124, 382/125, 126, 127, 128, 219, 278, 280, 211, 270; 359/559, 561

(56) References Cited

U.S. PATENT DOCUMENTS

| | | | | |
|---|---|---|---|---|
| 5,477,382 A | * | 12/1995 | Pernick | 359/559 |
| 5,485,312 A | * | 1/1996 | Horner et al. | 359/561 |
| 5,629,802 A | * | 5/1997 | Clark | 359/573 |
| 5,815,597 A | * | 9/1998 | Horner et al. | 382/211 |
| 6,373,661 B1 | * | 4/2002 | Tokuyama et al. | 360/236.6 |

* cited by examiner

*Primary Examiner*—Bhavesh Mehta
*Assistant Examiner*—Kanji Patel
(74) *Attorney, Agent, or Firm*—USAF ESC/JA

(57) ABSTRACT

In a binary joint transform correlator, a Fourier plane binarization threshold is provided which alternates between even and odd rows and reduces noise in the output plane and improves discrimination between matched and unmatched prints. Periodically correlating with a known standard input and normalizing the output peak intensity prevents correlator performance drift from degrading fingerprint recognition performance. Experimental system performance is assessed statistically, in terms of the false pass rate seen when operating with a constant false alarm rate. By applying both techniques, a false pass improvement from 6.95% to 0.076% is experimentally demonstrated at a false alarm rate of 0.1 percent.

20 Claims, 2 Drawing Sheets

TECHNIQUES TO IMPROVE BINARY JOINT TRANSFORM CORRELATOR, PARTICULARLY FOR FINGERPRINT RECOGNITION

STATEMENT OF GOVERNMENT INTEREST

The present invention may be used by or for the Government for governmental purposes without the payment of any royalty thereon.

BACKGROUND OF THE INVENTION

The binary joint transform correlator (BJTC) can easily be applied to fingerprint identification or recognition; see K. H. Fielding, J. L. Horner, and C. K. Makekau, "Optical fingerprint identification by binary joint transform correlation," Opt. Eng. 30, 1958–1961, (1991); B. Javidi, and J. L. Horner., "Optical pattern recognition for validation and security verification," Opt. Eng. 33, 1752–1756, (1994).

Since fingerprint recognition involves comparison of a pair of complicated images, it is an ideal application for optical correlators. While it is not clear that optical processing will ever yield a sizable speed increase over digital parallel processing, using a small digital computer with an optical coprocessor clearly has the potential for reduced size, weight, and power consumption over a digital multiprocessor computer with comparable performance for this application. To assess performance of a recognition system, the ability to discriminate matched prints from unmatched prints should be studied from a statistical viewpoint: see T. J. Grycewicz, "Fingerprint recognition using the binary nonlinear joint transform correlator," *Optoelectronic Devices and Systems for Processing*, Bahram Javidi and Kristina M. Johnson, ed., *Critical Reviews of Optical Science and Technology*, Vol. CR65, SPIE Press c. 1996.

Matched prints, referred to herein, are images of the same finger taken at different times, and unmatched prints are images of different fingers. To assure a low probability of false alarm and a low probability of false pass, it is necessary that the largest output peaks for unmatched prints be smaller than the smallest peaks seen for matched prints, in the presence of reasonable distortions from rotation, cuts, abrasions, stretching of the skin, or dirt. The performance metric used here was the probability of passing a false print under the constraint of a constant false alarm rate (CFAR).

It would be desirable to improve the performance of a single spatial light modulator (SLM) BJTC fingerprint correlator; see F. T. S. Yu, et al., "Adaptive real-time pattern recognition using a liquid crystal TV based joint transform correlator", *Appl. Opt.* 26, 1370 (1984).

A number of techniques have been presented for improving binary joint transform correlator (BJTC) performance, and have been shown to improve performance of fingerprint recognition systems. Frame subtraction is one; see T. J. Grycewicz and B. Javidi, "Experimental comparison of binary joint transform correlators used for fingerprint identification," Opt. Eng. 35, 2519–2525 (1996); and processing of a partial Fourier plane is another; see T. J. Grycewicz, "Fingerprint recognition using the binary nonlinear joint transform correlator," *Optoelectronic Devices and Systems for Processing*, Bahram Javidi and Kristina M. Johnson, ed., *Critical Reviews of Optical Science and Technology*, Vol. CR65. SPIE Press c. 1996.

These additional techniques can be utilized to further improve the performance of the BJTC fingerprint recognition system.

BRIEF SUMMARY OF A PREFERRED EMBODIMENT OF THE INVENTION

Noise in the Fourier plane of a BJTC is screened out by applying a binarization threshold which alternates between even and odd rows in the Fourier plane. Use of such alternating threshold reduces the effect of low amplitude Fourier plane signals on the output, and improves the system capability to discriminate between weak correlations and noise by a factor of greater than three. To counter output amplitude drift in the BJTC system, the output peak heights are normalized, to improve performance by a factor of almost three. When the two techniques are used together, a combined dramatic performance improvement to be described is attained.

BRIEF DESCRIPTION OF THE DRAWINGS

The various features of the invention will become more apparent upon study of the following description, taken in conjunction with the drawings in which.

DETAILED DESCRIPTION OF PREFERRED EMBODIMENTS OF THE INVENTION

Figure 1:
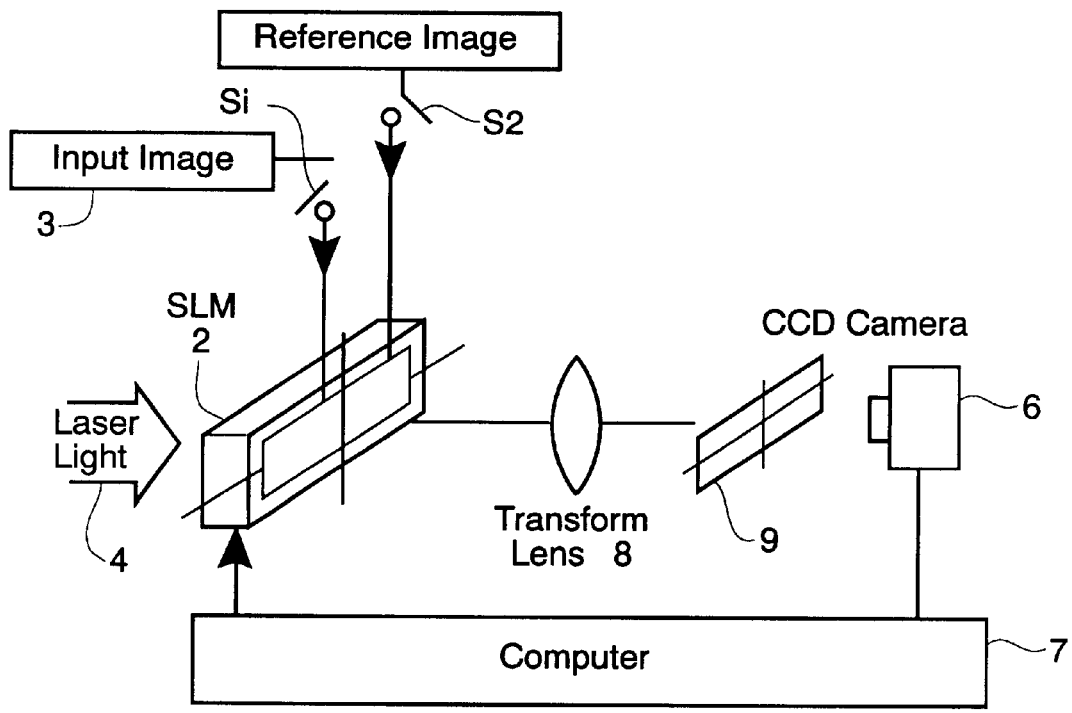
FIG. 1 schematically discloses a single SLM JTC of the prior art.

The joint transform correlator (JTC) implements a two stage correlation process. The two stages can be performed sequentially on the single SLM JTC shown in FIG. 1. First, the input image being examined, and the reference image retrieved from electronic storage, are displayed side by side in the input plane at the SLM 2 and a transform lens 8 is used to produce the Fourier transform. The input image means 3 coupled to SLM 2 via switch S1, could be a CCD camera. The reference images can be sequentially accessed from a library of electronically stored images via switch S2. The intensity of the Fourier Transform formed in plane 9 is the joint power spectrum, which is captured by a CCD camera 6. This signal is fed back via computer 7 and is displayed on the SLM as the second stage input. The output of the second stage, as captured by CCD camera 6, is the intensity of the Fourier transform of the joint power spectrum. Further details may be found in U.S. Pat. No. 5,040,140, entitled SINGLE SLM JOINT TRANSFORM CORRELATOR, issued to J. Horner and Bahram Javidi, and the aforesaid literature.

If the input fingerprints are represented as r(x,y) and s(x,y), and are separated by a distance $2x_0$, the input plane is $$i(x,y) = r(x-x_0,y) + s(x+x_0,y). \quad (1)$$

If the Fourier transforms of these prints are given by $R(\alpha,\beta)$ and $S(\alpha,\beta)$, with $\alpha$ and $\beta$ scaled by $1/\lambda f$. ($\lambda$ is the wavelength of the light, and f the focal length of the lens.) The joint power spectrum is $$I(\alpha,\beta)=|R(\alpha,\beta)|^2+|S(\alpha,\beta)|^2+2R(\alpha,\beta)S(\alpha,\beta)\cos(\alpha x_0). \qquad (2)$$

When the joint power spectrum is displayed on the SLM, the output is $$o(x,y)\ r(x,y)*r(x,y)+s(x,y)*s(x,y)+r(x-x_0,y)*s(x+x_0,y)+s(x+x_0,y)*r(x-x_0,y), \qquad (3)$$

where * denotes correlation. The output contains the auto-correlations centered on the optical axis, and cross-correlations to either side of the optical axis.

An asterisk is used herein in place of the more conventional five-pointed star used in the literature. In the BJTC, the joint power spectrum is binarized before being used as the input to the second stage. This results in more efficient use of the optical power and in bright, narrow output peaks. When a binary SLM is used in the single SLM JTC, it is necessary to binarize the input as well. Frame subtraction is a simple method to calculate the optimum threshold function in the Fourier plane. Two inputs are applied sequentially:

$$i_1(x,y)=r(x-x_0)+s(x+x_0)$$

$$i_2(x,y)=r(x-x_0)-s(x+x_0)' \qquad (4)$$

The joint power spectra are captured and stored. The term $-s(x+x_0)$ is produced by inverting every pixel in one of the fingerprints. The second stage input is found by binarizing the difference of the spectra, $$I_1(\alpha,\beta)-I_2(\alpha,\beta)=4R(\alpha,\beta)S(\alpha,\beta)\cos(\alpha x_0). \qquad (5)$$

This method works well when the input SLM modulates amplitude, phase, or a combination of amplitude and phase; see T. J. Grycewicz, "Applying time modulation to the optical joint transform correlator," *Opt. Eng.* 33, 1813–1820 (1994).

Light efficiency is improved when phase modulation is used. In a fingerprint recognition application, this technique can increase the correlation peak amplitude by a factor of four over using a simple global threshold; see T. J. Grycewicz and B. Javidi, "Experimental comparison of binary joint transform correlators used for fingerprint identification," *Opt. Eng.* 35, 2519–2525 (1996).

The single-lens BJTC shown in FIG. 1 was implemented around a 133 MHz desktop computer 7. The display device was a Kopin Corporation LVGA 640×480 active matrix twisted nematic liquid crystal SLM 2. The size of the display area of this SLM is 15.4×11.5 mm, and the pixel pitch is 24 microns with a 1:1 aspect ratio. While this SLM is capable of gray scale operation, binary modulation was of primary interest herein. The SLM was illuminated with a collimated beam 4 from a 2 mW 633 nm He—Ne laser. The output was captured using a DVC-10A CCD camera and a mu-tech MV-1000 framegrabber operated in 8 bit capture mode. The system was built on a portable 1×3 foot bench using a two lens system with an effective focal length of 0.7 m. The code to manage the correlation process was written in C, while preprocessing and post-processing used the IDL programming language. Correlations were cycled through the processor in sets of 41. Each correlation involved two cycles where the input prints were displayed and the joint spectrum captured, calculation of the binarized joint spectrum using the frame subtraction process, display of the binary joint spectrum, and capture of the output.

The objective of this study was to develop techniques to improve the performance of a fingerprint recognition system based on the BJTC. The metric chosen to assess performance was probability of false pass ($p_{fp}$) given a CFAR constraint. These were calculated based on the correlation of 75 matched pairs of fingerprints (measured through a range of rotations) and correlations for 6,320 unmatched pairs. Probability of false pass is defined as the probability that, for a given output threshold level, the recognition system would declare an unmatched pair as matched. Probability of false alarm is defined as the probability that, for a given threshold, a valid match will be declared a non-match.

The 75 fingerprint pairs used for inputs were drawn from a NIST database; see C. I. Watson and C. L. Wilson, NIST Special Database 4, Fingerprint Database. National Institute of Standards and Technology, Advanced Systems Division, Image Recognition Group, Gathersburg, Md. (1992).

These inputs are 512×512 pixel 8 bit gray scale images of fingerprints taken by the FBI. In each case the pair of images was drawn from two different fingerprint cards. In some cases the prints were taken years apart. For all 75 prints used, both images were clean. Overinked, underinked, or smudged prints were not used. Differences from twisting, streaching, cuts, and abrasions were present.

The first preprocessing step was to choose a common center for the prints in each matched pair, and rotate them to approximately the same orientation. One of the two images was then rotated from −10° to +10° in 0.5° intervals, for a total of 41 rotations. A central 320×360 pixel region in each of the 41 gray scale images was binarized and saved. The matched fingerprint was binarized without rotation. The binarization routine convolved each fingerprint image with a spatial high pass kernel and binarized the result by thresholding at zero. (After convolution, the image has a mean of zero.) The kernel used was $$w=\begin{bmatrix} -1 & -1 & -1 & -1 & -1 \\ -1 & 1 & 1 & 1 & -1 \\ -1 & 1 & 8 & 1 & -1 \\ -1 & 1 & 1 & 1 & -1 \\ -1 & -1 & -1 & -1 & -1 \end{bmatrix}. \qquad (6)$$

Figure 2:
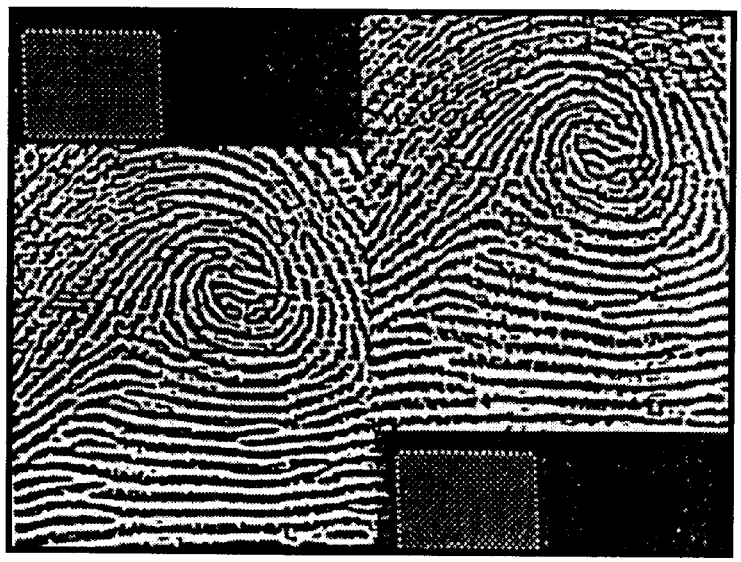
FIG. 2 discloses, in the input plane, the fingerprints offset vertically to raise the output peak off of the x axis in the output plane.

A typical 640×480 pixel input is shown in FIG. 2. The gray areas above and below the prints were filled with checkerboard patterns used for diagnostics.

In a typical joint power spectrum, as captured by the CCD camera, only the upper half of the joint power spectrum is captured and binarized. The optical axis is just off the bottom edge of the camera. Almost no information is lost, since the lower half of the spectrum is radially symmetric with the upper half. (Since the Fourier transform is Hermetian, the real portion of the transform is symmetric and the imaginary portion is antisymmetric along any line passing through the origin. The power spectrum, which is the intensity of this signal, is symmetric.) It has been shown that using half of the spectrum in this way leads to better correlation performance and eliminates the problem of having to deal with the optical axis on the CCD array. See T. J. Grycewicz, "Fingerprint recognition using binary joint transform correlators with constant false alarm rate," Optical Pattern Recognition VIII, SPIE Proceedings v. 3073, D. P. Casasent and T. H. Chao, eds., 366–372 (1997). Since the bright signal on the optical axis is more than an order of magnitude more intense than the signal elsewhere in the joint power spectrum, either this signal must be blocked or the sensitivity of the camera must be reduced to prevent damage to the CCD array.

The output correlation was measured as the maximum intensity in the box in the lower right corner of the output plane. The output location is above the optical axis as a result of the inputs being offset vertically and near the right edge of the output because the optical axis is off center to the left on the CCD array. (If the fingerprint images were not offset, the correlation peak would line up horizontally with the optical axis, and if the optical axis were centered on the camera, the correlation peak would fall exactly at the edge of the CDD array.) The output region is a 32×32 pixel area. This allows mis-registration of the input fingerprint images (life size) by up to ±2.5 mm with the center of the output peak still falling in the output region.

The primary improvement made to the processing algorithm in accordance with the present invention, was to vary the Fourier plane binarization threshold from row to row. Use of multiple Fourier plane thresholds was first suggested by Javidi and Wang; see "Binary nonlinear joint transform correlator with median and subset median thresholding," *Appl. Opt.* 30, 967–976 (1991).

On odd rows, the threshold was raised by up to eight counts. On even rows, it was lowered by the same amount. The output intensity is defined in counts, where 255 counts is the CCD saturation level. The mean intensity of the joint power spectrum was 14.1 counts. After subtraction, the joint spectrum has both positive and negative pixels, and has a mean of zero. The default binarization threshold was zero counts. A threshold of +4 counts for odd rows and −4 counts for even rows was used, and thus varying the thresholds slightly. For regions of the subtracted joint spectrum with a magnitude of greater than 4 counts, the output is the same as for simple binarization. For areas where the magnitude is 4 or less, the output is a pattern of horizontal bars. The reason that this method improves the correlator performance is that portions of the Fourier plane where the correlation component of the signal is weak tend to contribute more noise than signal to the output plane. The alternating horizontal bar pattern diffracts light out of the output region, removing a potential source of noise. The effect of this bias shifting is similar to using ternary modulation on the SLM; see W. B. Hahn and D. L. Flannery, "Basic design elements of binary joint transform correlation and selected optimization techniques", *Opt. Eng.* 31,896–905 (1992).

Only portions of the joint spectrum with strong signal variation between the two spectra captured for the subtraction process result in energy being diffracted into the output region of the correlation plane. This reduces the correlation peak height for both matched prints and for unmatched prints. A correctly chosen bias will minimize noise in the Fourier plane while passing signals resulting from correlation of matched prints. Much of the noise masked by the alternating bias is valid correlation between similar regions in a pair of unmatched prints.

Thus, alternate row thresholding is applied in the intermediate stage of the binary joint transform correlator (BJTC) in order to improve the probability of detecting a target or pattern match. It does this by superimposing a signal on top of the joint power spectrum which corresponds to a pattern match or target outside of the valid region for a pattern match. In the output all real correlations share the available output power with this introduced signal. The result is that all signals in the output plane are suppressed to some extent. However, very weak signals and noise are suppressed to a much larger extent than strong signals. The effect of this strong suppression of noise and weak correlations is a reduction in the false alarm rate.

The input stage of the BJTC is set up in the conventional manner. The joint power spectrum from a pair of images is captured by a camera and binarized. Alternate row thresholding is applied to the joint power spectrum like any other preprocessing is applied. Other preprocessing which may be applied includes frame subtraction and spatial high pass filtering. When alternate row thresholding is used in conjunction with one of these techniques, a sizeable detection performance can be realized. (Alternate row thresholding may be applied without preprocessing, but the expected performance gain would be small.) Since frame subtraction and high pass spatial filtering both result in a Fourier plane signal with zero mean and have zero as the appropriate binarization threshold, a base threshold of zero will be assumed for this explanation.

The first step in the process is to break the Fourier plane into narrow horizontal or vertical strips. The most convenient way to do this is to use one or two pixel wide horizontal strips—rows of data as taken off of the camera. If the strips are numbered, they may then be broken into two groups corresponding to even and odd strips. These strips will be binarized with slightly different thresholds. If the signal ranges from −255 to 255 and the overall threshold is zero (a common case) the threshold of +5 might be used for even rows and −5 for odd rows.

The effect will be to place an alternating bias on the threshold value. In areas where there is little or no correlation signal present in the joint power spectrum the output fed to the second stage of the BJTC will be alternating bars corresponding to the alternating threshold. In areas where the correlation signal is strong (or the noise is particularly large) the output to the binarized joint power spectrum will be uneffected.

The binarized joint power spectrum is processed as usual. A second, optical or digital, Fourier transform forms the correlation plane. It should be noted that the bars formed by the alternate row threshold will form large peaks in the output plane. However, it is easy to set the row pattern of so that these peaks are far outside of the valid correlation region. In certain of my experiments, these peaks are entirely off of the camera surface in the output plane.

Figure 3:
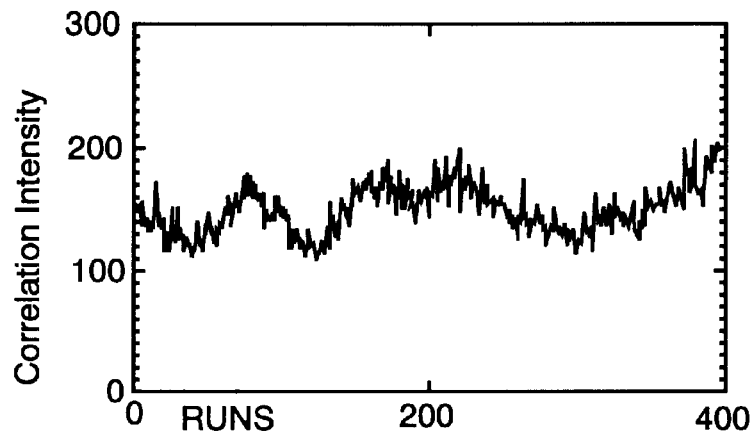
FIG. 3 indicates correlation intensity for the best match rotation of a single pair of fingerprints on 400 consecutive correlation runs, with each run correlating at 41 relative angles.

Early in the study it was noticed that correlation intensity drifted during the course of an experimental session. FIG. 3 shows the variation on a correlation peak on 400 consecutive correlation runs taken over 16 hours. The source of this drift was not identified. Since the laser, SLM, and camera are used in both processing stages, any performance variation is magnified. In order to minimize this drift, the number of correlations in a run was increased from 41 to 42, and a standard input was inserted at the 21st correlation. The print pair used to generate FIG. 3 was the standard input. When the set of output peak heights for a run was processed, all 42 peak intensities were normalized to make this standard peak have a value of 150.

The effect of this normalization can be seen by comparing results for two identical runs of 6,320 unmatched prints. Before normalization, the peak correlation had a mean of 24.9 counts and a standard deviation of 11.3 counts. The mean square difference between the outputs for the same input on the two unmatched runs was 8.6 counts. After normalization, the mean was 24.5, the standard deviation 9.4, and the rms difference was 4.8. The normalization reduced the run to run variation by almost a factor of 2.

The experimental runs gathered two sets of data. Matched data recorded the correlation peak height for each of the 75 prints with 41 rotations of its partner print. The unmatched data used a set of 80 different prints (the 75 baseline prints and 5 more). Each was correlated with the other 79. for a total of 6320 unmatched correlations. Multiple runs were done for each set of data in order to allow a check of consistancy and to provide a larger statistical base. For each correlator configuration 4 to 8 sets of matched runs and 2 sets of unmatched runs were analyzed.

Figure 4:
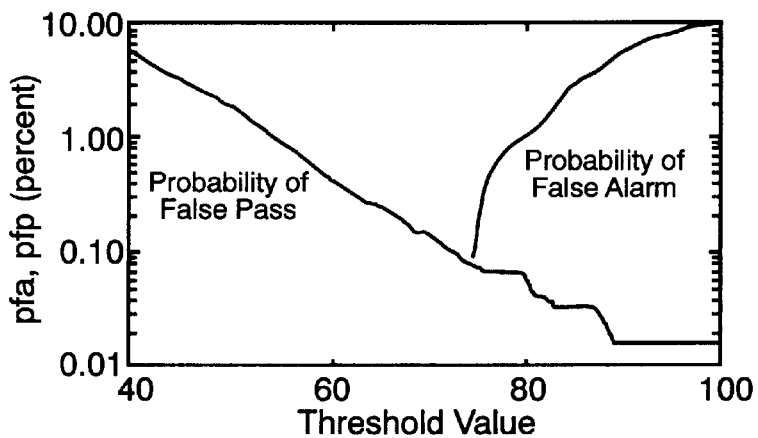
FIG. 4 indicates probability of False Pass and Probability of False Alarm vs. threshold value in the output plane for the case where the threshold difference between alternating rows in the Fourier plane was 10 counts, referenced to a camera saturation intensity of 255 counts.

The histogram of the unmatched correlations is used to determine the probability of incorrectly declaring a match. This determines $p_{fp}$, as a function of threshold level. A histogram of the peak intensities for the rotation range considered was used to determine the probability of declaring a match at each threshold value (and conversely, the probability of not declaring a match, and giving a false alarm). A graph of $p_{fp}$ and $p_{fa}$ as a function of the threshold value is shown in FIG. 4. The data from 40 matched correlation runs was averaged to determine the best match rotation for each print pair. Statistical analysis used a range of rotation. The range used to compare overall performance was the best match and one 0.5° rotation step to either side (for an uncertainty of ±1°). Wider ranges were used to investigate the effect of rotation on performance.

Figure 5:
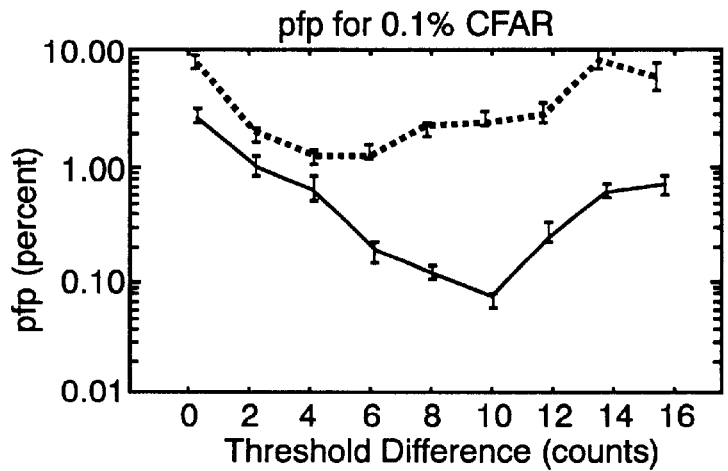
FIG. 5 indicates probability of false pass for a CFAR of 0.1% as a function of binarization threshold difference for an input acceptance range of ±1°. The dotted line shows the results without normalization and the solid line with normalization.

FIG. 5 shows the probability of false pass for both normalized and raw correlation data as a function of the threshold difference between alternating rows in the Fourier plane for a CFAR of 0.1%. The best performance ($p_{fp}$= 0.076%) was for a threshold difference of 10 (alternating thresholds of +5 and −5). In order to calculate $p_{fp}$ for a CFAR of 0.1, histogram data for the matched prints is used to find a best line fit for $p_{fa}$ from 0.05% to 0.5%. This determines the threshold for a false alarm rate of 0.1%. Histogram data for unmatched prints is used to find a best fit line for $p_{fp}$ vs. threshold in the neighborhood of this chosen threshold. The center points in FIG. 7 are calculated this way. The high and low error bars which bracket the center value are the measured $p_{fp}$ for the histogram bins one above and one below the bin containing the threshold value. Each histogram bin had a width of one.

Intensity as a function of rotation for a print pair with strong correlation was investigated. The data for a single set of normalized peaks used a ±5 count alternating Fourier plane threshold. The correlation signal here drove the camera into saturation when the prints were within a degree of proper alignment. In this run, 32 of the 75 matched fingerprints saturated the detection peak for at least one rotation. A split in the peak is caused by rotation of the finger during the printing process. Splitting of the peak was seen in 37 of the 75 matched pairs. The algorithm which chooses the best rotation center chooses the higher of the two peaks. A performance summary for rotation ranges of up to ±5° at a CFAR of 1.0% was produced. To determine the false pass probabilities, data for all rotation angles up to the given range are used to determine the detection threshold for a CFAR 1.0% with a given input range acceptance. A uniform distribution of rotation angles is assumed. In all cases, the combination of normalization and alternating binarization threshold shows the best performance. Alternating threshold alone outperforms normalization alone in all cases but the ±0.5° case. It appears that the correlator performance becomes too poor for practical applications if the angle variation range must be larger than ±3°. This compares well with the results of an earlier studies using a similar data set. The rotation problem can be avoided by correlating to multiple rotated reference fingerprints. However, this increases the number of correlations which must be done for each recognition.

In conclusion, the combination of an alternating threshold in the Fourier plane and normalization of the correlation peak height has been shown to lead to a combined performance improvement of 99.6 in a BJTC based fingerprint recognition system operating in a CFAR mode with a 0.1% false alarm rate and an allowed acceptance angle of ±1°. Using broader acceptance angles and a CFAR of 1.0%, it was shown that performance is reasonable for acceptance angles of up to plus or minus a few degrees. This performance level is compatible with a wide range of recognition and identification applications. An optical coprocessor is promising for these applications since it is possible to build optical processors with a smaller size and lower power consumption than a multiprocessor digital system with similar performance.

The false pass rate was improved from 6.95% to 0.076% at a 0.1% probability of false alarm when the BJTC system was tested using fingerprint images from a NIST database. It should be noted that this database contains images of FBI fingerprint cards and the prints are of significantly poorer quality than fingerprints from modern direct fingerprint imagers. These performance improvements are not expected to combine linearly. The probabilities of false pass and false alarm are determined by the overlap of the probability density functions of the correlation peak intensities for matched and unmatched prints.

Since variations of the foregoing will readily occur to skilled workers in the art, the scope of the invention is to be limited solely to the terms in the claims, and equivalents thereof.

What is claimed is:

1. In a method of correlating a pair of input images applied to a binary joint transform correlator, the improvement comprising:
    (a) providing a binary joint transform correlator for receiving said pair of input images to be correlated and for producing correlation signals; and
    (b) producing binarization thresholds which alternate between successive rows of power spectrum data produced by said binary joint transform correlator.

2. The method of claim 1 wherein step (b) comprises producing thresholds which alternate between even and odd rows of said power spectrum data.

3. The method of claim 1 further including normalizing the output peak intensities of said correlation signals.

4. The method of claim 2 further including normalizing the output peak intensities of said correlation signals.

5. The method of claim 1 wherein said binary thresholds have a zero mean.

6. The method of claim 2 wherein said binary thresholds have a zero mean.

7. The method of claim 3 wherein said binary thresholds have a zero mean.

8. The method of claim 4 wherein said binary thresholds have a zero mean.

9. In a method of correlating a pair of input images applied to a binary joint transform correlator, the improvement comprising:
    (a) providing a binary joint transform correlator for receiving said pair of input images, said correlator having a Fourier plane; and
    (b) varying Fourier plane binarization thresholds slightly from row to row in said Fourier plane.

10. The method of claim 9 wherein step (b) comprises producing thresholds which alternate between even and odd rows of said power spectrum data.

11. The method of claim 9 further including normalizing the output peak heights of said correlation signals.

12. The method of claim 10 further including normalizing the output peak heights of said correlation signals.

13. The method of claim 9 wherein said binary thresholds have a zero mean.

14. The method of claim 10 wherein said binary thresholds have a zero mean.

15. The method of claim 11 wherein said binary thresholds have a zero mean.

16. The method of claim 12 wherein said binary thresholds have a zero mean.

17. In a method of correlating a pair of input images applied to a binary joint transform correlator, the improvement comprising:

(a) providing a binary joint transform correlator for receiving said pair of input images to be correlated and producing correlation peak output signals having heights proportional to the degree of correlation between said input images;

(b) producing binarization thresholds which alternate between successive rows of power spectrum data produced by said binary joint transform correlator; and (c) normalizing peak heights of said correlation peak output signals.

18. The method of claim 1 wherein said input images are images of fingerprints.

19. The method of claim 9 wherein said input images are images of fingerprints.

20. The method of claim 17 wherein said input images are images of fingerprints.

* * * * *